United States Patent
Tsukamoto

(10) Patent No.: US 11,463,621 B2
(45) Date of Patent: Oct. 4, 2022

(54) IMAGE PICKUP APPARATUS, OPTICAL APPARATUS, CONTROL APPARATUS OF THE OPTICAL APPARATUS, CONTROL METHOD, AND MEDIUM, FOR CONTROLLING DRIVING MODE OF A DRIVER BASED ON SUPPLY POWER LEVEL OR DRIVING STATE THEREOF

(71) Applicant: CANON KABUSHIKI KAISHA, Tokyo (JP)

(72) Inventor: Suguru Tsukamoto, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/064,995

(22) Filed: Oct. 7, 2020

(65) Prior Publication Data
US 2021/0120187 A1 Apr. 22, 2021

(30) Foreign Application Priority Data
Oct. 21, 2019 (JP) .............................. JP2019-191639

(51) Int. Cl.
*H04N 5/232* (2006.01)
*H04N 5/225* (2006.01)

(52) U.S. Cl.
CPC ..... *H04N 5/232411* (2018.08); *H04N 5/2253* (2013.01)

(58) Field of Classification Search
CPC .......... H04N 5/232411; H04N 5/2253; H04N 5/23209; H04N 5/2254
See application file for complete search history.

(56) References Cited

U.S. PATENT DOCUMENTS

| | | | | |
|---|---|---|---|---|
| 4,952,962 A * | 8/1990 | Suzuki | ...................... | G02B 7/36 396/93 |
| 7,081,924 B2 * | 7/2006 | Tsuda | .................. | H04N 1/00899 348/372 |
| 7,432,684 B2 * | 10/2008 | Iwamoto | .......... | H04N 5/232941 320/100 |
| 9,282,254 B2 * | 3/2016 | Watanabe | ............... | H04N 5/361 |
| 2005/0062878 A1 * | 3/2005 | Ogawa | ............... | H04N 5/23241 348/372 |
| 2009/0284643 A1 * | 11/2009 | Shibuno | .................. | G03B 13/00 348/347 |
| 2011/0234887 A1 | 9/2011 | Shimohata | | |
| 2011/0292278 A1 * | 12/2011 | Kurihara | ............... | H02J 7/0031 348/372 |
| 2014/0186017 A1 * | 7/2014 | Shibata | .................... | G03B 5/00 396/55 |

(Continued)

FOREIGN PATENT DOCUMENTS

JP 2011221519 A 11/2011

*Primary Examiner* — Padma Haliyur
(74) *Attorney, Agent, or Firm* — Rossi, Kimms & McDowell LLP

(57) ABSTRACT

A control apparatus is configured to control a driver configured to drive a driven member, which driver is provided in an optical apparatus that is attachable to and detachable from an image pickup apparatus. The control apparatus includes an information acquirer configured to acquire information on a suppliable power from the image pickup apparatus to the optical apparatus, and a changer configured to change a control method of the driver according to the information.

14 Claims, 8 Drawing Sheets

(56) References Cited

U.S. PATENT DOCUMENTS

2016/0057347 A1\* 2/2016 Gleason ................ H04N 5/217
                                                    348/220.1
2020/0304711 A1\* 9/2020 Suzuki ................ H04N 5/2252

\* cited by examiner

IMAGE PICKUP APPARATUS, OPTICAL APPARATUS, CONTROL APPARATUS OF THE OPTICAL APPARATUS, CONTROL METHOD, AND MEDIUM, FOR CONTROLLING DRIVING MODE OF A DRIVER BASED ON SUPPLY POWER LEVEL OR DRIVING STATE THEREOF

BACKGROUND OF THE INVENTION

Field of the Invention

The present invention relates to a control over an actuator mounted with an optical apparatus.

Description of the Related Art

When an actuator such as a motor is driven so as to drive a driven member such as a lens when an optical image is converted into an electric signal (imaging signal) by an image sensor such as a CMOS sensor, a drive noise or switching noise generated from the actuator may be superimposed on the imaging signal.

As a control method for controlling driving of the actuator, there are a pulse width modulation control method (also referred to as a PWM control method and a digital control method) and a linear control method (also referred to as a DC control method and an analog control method). The pulse width modulation control method has a power loss less than the linear control method and is effective for power saving, but switching noises are likely to occur. Japanese Patent Laid-Open No. 2011-221519 discloses a technology of switching between a pulse width modulation control system and a linear control system according to the condition of an object to be imaged.

An optical apparatus, such as a lens apparatus, that can be attached to and detached from the image pickup apparatus receives power from the image pickup apparatus and drives the actuator using the power. However, when the actuator power consumption is increased by switching the pulse width modulation control method to the linear control method and a power consumption of the actuator exceeds the power supplied from the image pickup apparatus to the optical apparatus, the actuator cannot be properly driven.

SUMMARY OF THE INVENTION

The present invention provides a control apparatus that can properly drive an actuator while reducing noises caused by driving the actuator when the power is supplied from an image pickup apparatus to an optical apparatus including the actuator.

A control apparatus according to one aspect of the present invention is configured to control a driver configured to drive a driven member, which driver is provided in an optical apparatus that is attachable to and detachable from an image pickup apparatus. The control apparatus includes an information acquirer configured to acquire information on a suppliable power from the image pickup apparatus to the optical apparatus, and a changer configured to change a control method of the driver according to the information.

A control apparatus according to one aspect of the present invention is configured to control a first driver configured to drive a first driven member and a second driver configured to drive a second driven member, the first driver and the second driver being provided in an optical apparatus that is attachable to and detachable from an image pickup apparatus. The control apparatus includes a driving state acquirer configured to acquire a driving state of each of the first driver and the second driver, and a changer configured to change a control method of the first driver according to the driving state.

An image pickup apparatus including one of the above control apparatuses also constitutes another aspect of the present invention. A control method corresponding to the above control apparatus and a non-transitory computer-readable storage medium storing a computer program for causing a computer that controls an optical apparatus that is attachable to and detachable from an image pickup apparatus, to execute the control method also constitute another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
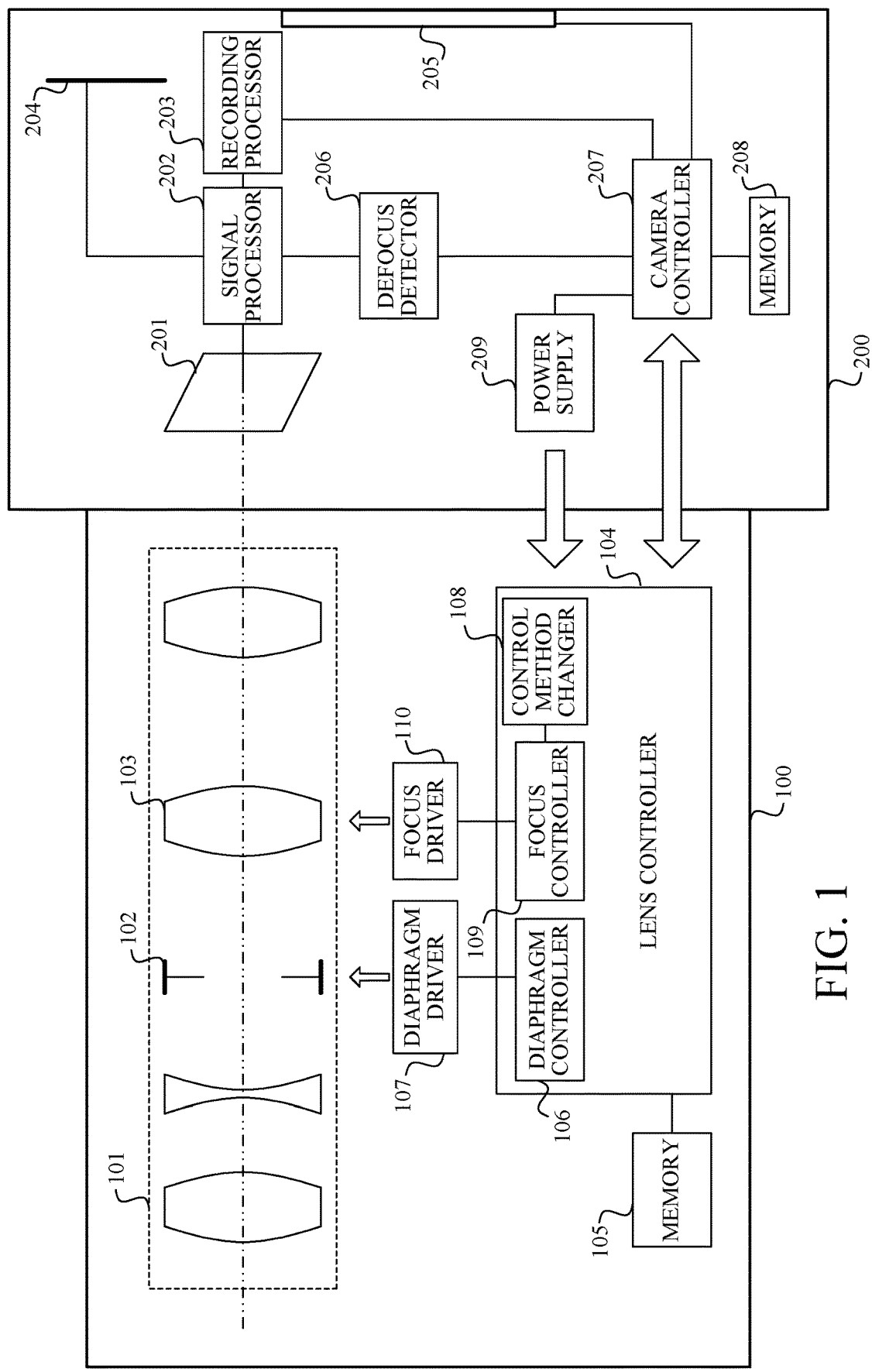
FIG. 1 illustrates a configuration of a camera system according to a first embodiment of the present invention.

FIG. 1 illustrates a configuration of an interchangeable lens type camera system 10 according to a first embodiment of the present invention. The camera system 10 includes a camera body 200 that is an image pickup apparatus and a lens apparatus 100 that is an optical apparatus that is attachable to and detachable from the camera body 200.

The lens apparatus 100 has an imaging optical system 101 that images light from an object. The imaging optical system 101 is a single focus lens with a fixed image magnification. The imaging optical system 101 includes a diaphragm (aperture stop) 102 that changes an aperture diameter in adjusting a depth of field, and a focus lens 103 that moves along the optical axis of the imaging optical system 101 during focusing of an object image.

The lens apparatus 100 includes a lens controller 104, a focus driver 110, a diaphragm driver 107, and a lens memory 105. The lens controller 104 is a computer having a CPU and an internal memory, and includes a diaphragm controller 106 and a control method changer 108. The lens controller 104 also serves as a communicator that communicates with a camera controller 207 provided in the camera body 200. The lens controller 104 receives, from the camera controller 207, a drive command for the diaphragm 102 and the focus lens 103, and information on power suppliable to the lens apparatus 100 from the camera body 200 (referred to as power information hereinafter). The lens controller 104 corresponds to an information acquirer and a control apparatus.

The lens memory 105 includes a ROM, a RAM, and the like, and stores various kinds of information, for example, information on the depth of field with respect to the aperture diameter of the diaphragm 102 and information on the object distance with respect to the position of the focus lens 103.

The focus controller 109 controls driving of the focus driver (first driver) 110 according to the focus driving command from the camera controller 207. The focus driver 110 including the focus actuator and its driver is driven according to a drive command from the focus controller 109, and moves the focus lens 103 that is a driven member. The focus driver 110 can control driving by a linear control method and a pulse width modulation control (PWM) method. The focus controller 109 controls driving of the focus driver 110 by the control method notified from the control method changer 108 as a changer. The control method changer 108 changes (sets) the control method of the focus driver 110 instructing the focus controller 109 according to the power information received by the lens controller 104 from the camera controller 207. Details of processing of changing the control method of the focus driver 110 will be described later.

The diaphragm controller 106 controls driving of the diaphragm driver (second driver) 107 according to the diaphragm driving command from the camera controller 207. The diaphragm driver 107 including a diaphragm actuator and its driver drives the diaphragm 102, which is a driven member, according to a driving command from the diaphragm controller 106.

The camera body 200 includes an image sensor 201, a signal processor 202, a recording processor 203, an electronic viewfinder 204, a display unit 205, a defocus detector 206, a camera controller 207, a camera memory 208, and a power supply 209.

The image sensor 201 photoelectrically converts the object image (optical image) formed by the imaging optical system 101 to generate an imaging signal as an electric signal, and outputs it to the signal processor 202. The image sensor 201 has a focus detecting pixel for generating a focus detecting signal in addition to an imaging pixel for generating an imaging signal.

The signal processor 202 performs various processing such as an amplification, noise removals, and a color correction for the input imaging signal, generates an image signal, and outputs the image signal to the recording processor 203. The recording processor 203 records the input image signal. The signal processor 202 also outputs the image signal to the electronic viewfinder 204 and the camera controller 207. The electronic viewfinder 204 displays an image corresponding to the image signal. The camera controller 207 outputs the image signal to the display unit 205 to display the image corresponding to the image signal. The display unit 205 has a touch operation function for a user to set an imaging condition such as an ISO speed and a depth of field in addition to an image displaying function.

The defocus detector 206 detects a focus state of the object image using the signals (paired image signals) from the focus detecting pixels on the image sensor 201. More specifically, the defocus detector 206 performs a correlation calculation for the pair of image signals to calculate the phase difference between them, calculates the defocus amount from the phase difference, and outputs it to the camera controller 207.

The camera controller 207 is a computer having a CPU, an internal memory, etc., reads a computer program stored in the camera memory 208, and performs an autofocus (AF) control according to the program. At this time, the camera controller 207 receives information indicating the position of the focus lens 103 and focus sensitivity necessary for the AF control from the lens controller 104, calculates a driving amount of the focus lens 103 based on the information and the defocus amount, and transmits a focus driving command including it to the lens controller 104. As described above, the focus controller 109 in the lens controller 104 controls driving of the focus driver 110 according to the received focus driving command to move the focus lens 103 to the position where the in-focus state is obtained. Thereby, the phase difference detection AF is performed.

The power supply 209 has a battery and supplies the power for operating each unit in the camera body 200, and also supplies the power to the lens apparatus 100. The camera controller 207 calculates the power suppliable to the lens apparatus 100 (referred to as a suppliable power hereinafter) based on the remaining battery life acquired from the power supply 209, and transmits power information on the suppliable power to the lens controller 104. Details of the relationship between the remaining battery life and the suppliable power will be described later. The power information may directly indicate a value of the suppliable power, or may indicate which of the plurality of levels the suppliable power is, or may be one that can be converted into the suppliable power. The information on the suppliable power may be information on the suppliable current.

The camera controller 207 generates a diaphragm driving command according to the imaging condition such as the depth of field set by the user through the display unit 205, and transmits this to the lens controller 104. As described above, the diaphragm controller 106 in the lens controller 104 controls driving of the diaphragm driver 107 according to the received diaphragm driving command to drive the diaphragm 102.

Figure 2:
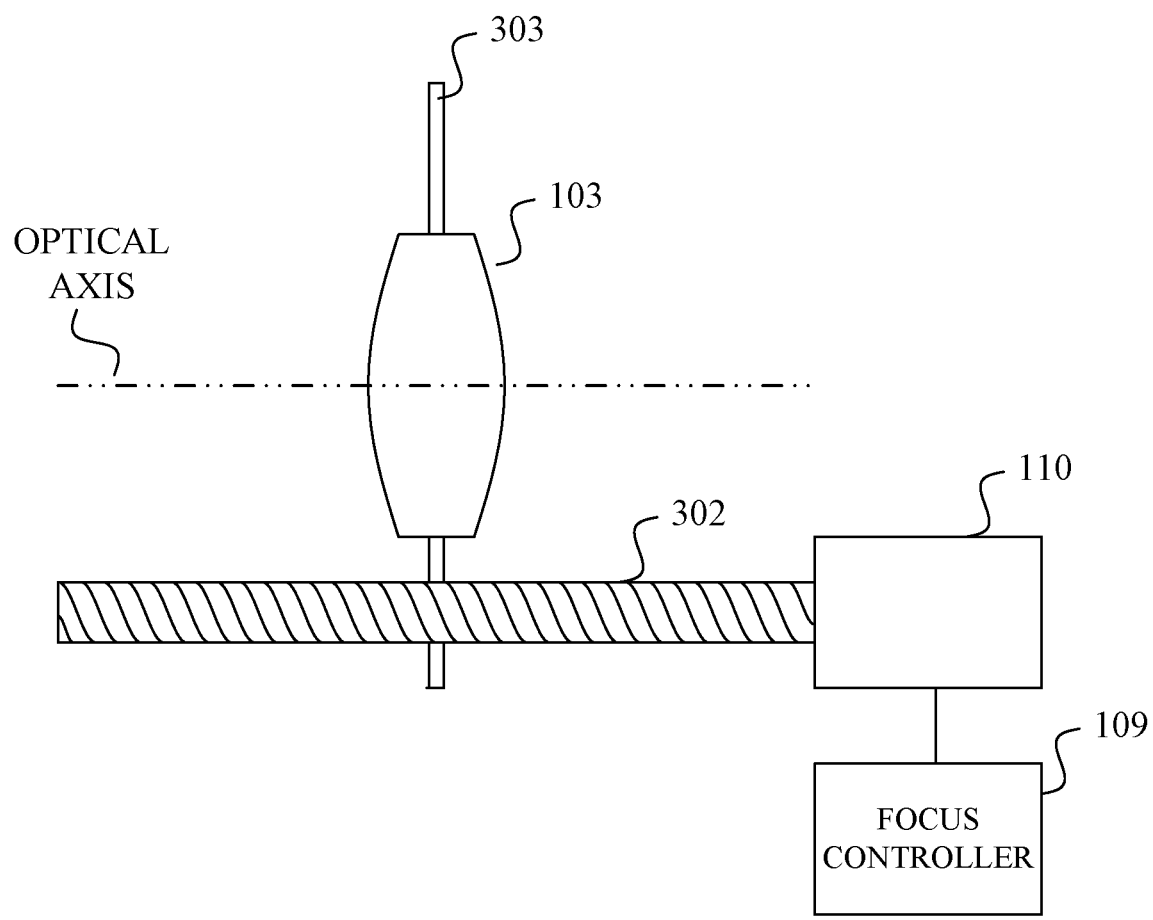
FIG. 2 illustrates a driving mechanism for an actuator according to the first embodiment.

Referring now to FIG. 2, a description will be given of driving of the focus lens 103 by the focus driver 110. The focus driver 110 includes a stepping motor as a focus actuator, and a driver. The output shaft of the stepping motor is connected to a lead screw 302. A rack 303 provided on the focus lens 103 is engaged with the lead screw 302. When the driver that receives the driving command from the focus controller 109 rotates the stepping motor, the lead screw 302 rotates, and the focus lens 103 moves with the rack 303 engaged with it along the optical axis. An actuator other than the stepping motor, such as a vibration type motor and a voice coil motor, may be used as the focus actuator.

Figure 3A:
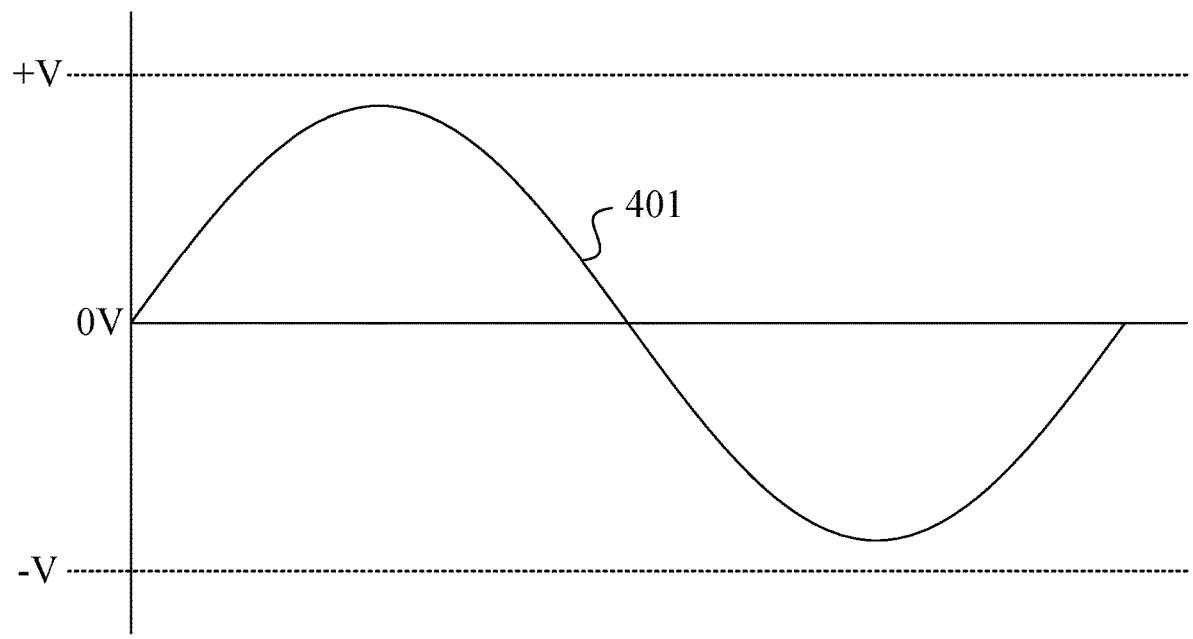
FIGS. 3A and 3B illustrate a control system for the actuator according to the first embodiment.
Figure 3B:
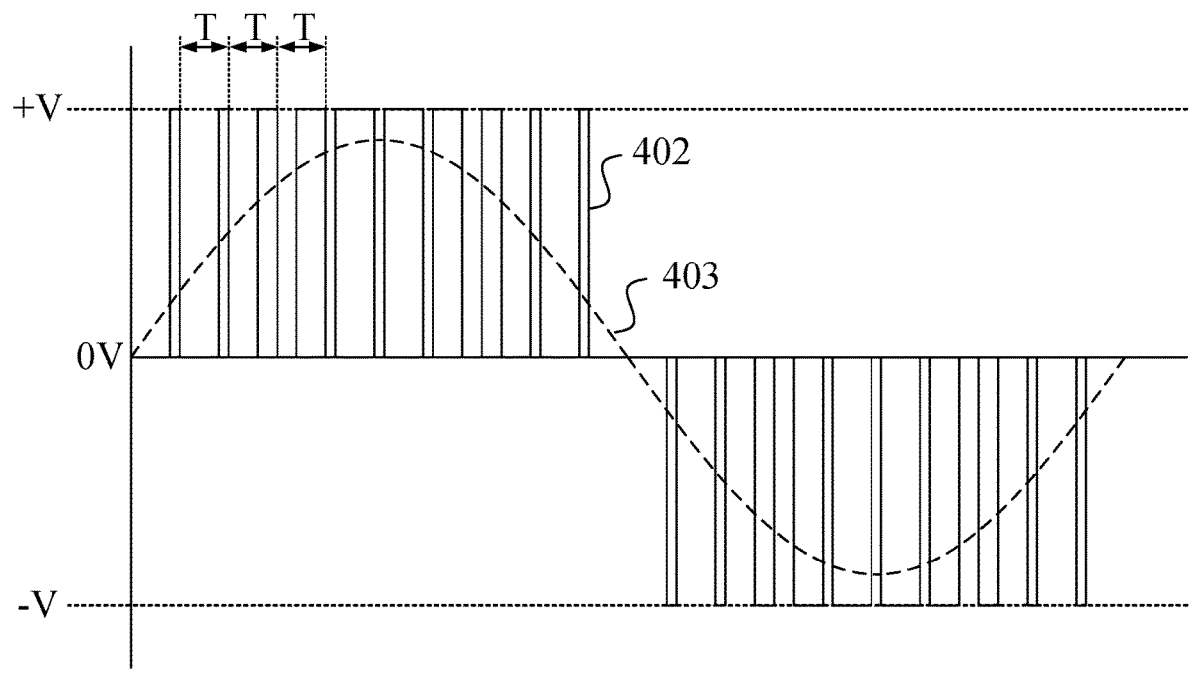

FIGS. 3A and 3B respectively illustrate a linear control method (first control method) and a pulse width modulation control method (second control method) used when the focus controller 109 controls driving of the focus driver 110. In each control method, a signal output from the driver of the focus driver 110 to the stepping motor is a two-phase signal in which phases shift from each other by 90°, but only one-phase signal is illustrated because these signals are not different from each other except the phase.

In the linear control method shown in FIG. 3A, an output signal 401 from the driver is a sine wave signal whose amplitude fluctuates between +V and −V. −V does not mean a negative voltage, but means a voltage in the opposite direction to +V. On the other hand, in the pulse width modulation control method shown in FIG. 3B, the amplitude of the pulse signal 402 from the driver fluctuates between 0V to +V and 0V to −V. An output period T of the pulse signal 402 is constant, and by changing the time width of the pulse signal 401 within the period T, a pseudo sine wave 403 is generated as shown by a broken line. The pulse width modulation control method consumes a power lower than the linear control method, although it generates more noises generated when the focus driver 110 is driven. On the contrary, the linear control method consumes a power more than the pulse width modulation control method, but generates a smaller noise amount generated when the focus driver 110 is driven.

Figures 4, 5:
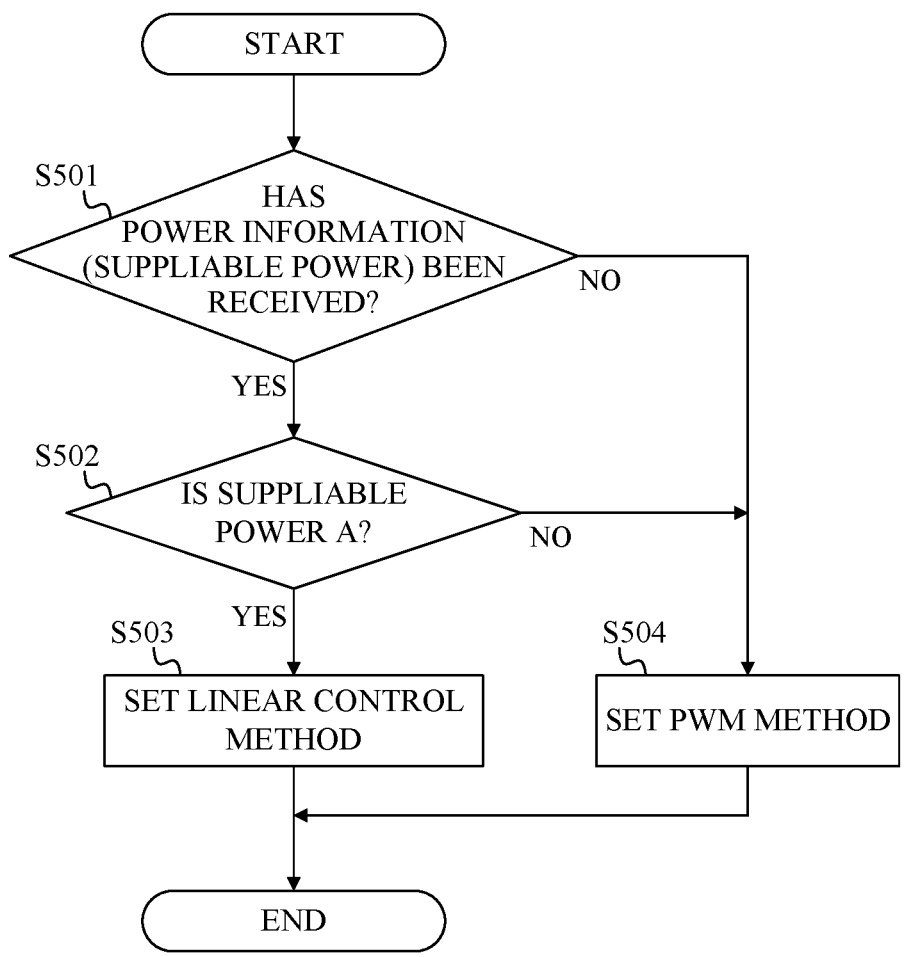
FIG. 4 illustrates a suppliable power according to the first embodiment.
FIG. 5 is a flowchart showing control method changing processing according to the first embodiment.

FIG. 4 illustrates illustrative power information transmitted to the lens controller 104 with respect to the remaining battery life (or amount) read out of the power supply 209 by the camera controller 207. The camera controller 207 transmits "A (level)" as the power information to the lens controller 104 when the remaining battery life is 50% or more, and "B (level)" as the power information to the lens controller 104 when the remaining battery life is less than 50%. The lens controller 104 can recognize from the power information indicating the A level that the suppliable power is, for example, 6 W, and can recognize from the power information indicating the B level that the suppliable power is, for example, 3 W.

A flowchart in FIG. 5 shows processing in which the control method changer 108 sets (changes) the control method instructing the focus controller 109. In FIG. 5, S stands for the step. The control method changer 108 starts this processing according to a computer program when the lens apparatus 100 is activated (power supply starts), when a focus driving command is received from the camera controller 207, when the remaining battery life in the camera body 200 fluctuates, and the like.

In the step 501, the control method changer 108 determines whether or not the power information is received (obtained) from the camera controller 207. If it is received, the flow proceeds to the step 502, and if it is not received, the flow proceeds to the step 504.

In the step 502, the control method changer 108 determines whether or not the suppliable power indicated by the received power information is at the A level, and if it is at the A level, the flow proceeds to the step 503, otherwise (if it is at the B level), the flow proceeds to the step 504.

In the step 503, the control method changer 108 instructs the focus controller 109 to set the linear control method as the control method of the focus driver 110 because the suppliable power is sufficient. Then, this processing ends.

On the other hand, in the step 504, the control method changer 108 instructs the focus controller 109 to set the pulse width modulation control method as the control method of the focus driver 110 because the suppliable power is unknown or insufficient. Then, this processing ends.

According to this embodiment, when the power suppliable from the camera body 200 to the lens apparatus 100 is equal to or greater than a predetermined value (remaining battery life is 50%), a linear control method with a smaller noise amount is used as the control method of the focus driver 110. When the suppliable power is lower than the predetermined value, the pulse width modulation control method is set in which the focus driver 110 consumes a lower power. Thereby, the focus lens 103 can be properly driven according to the power suppliable from the camera body 200 to the lens apparatus 100 while reducing noises that may be superimposed on the imaging signal from the image sensor 201.

Second Embodiment

Figure 6:
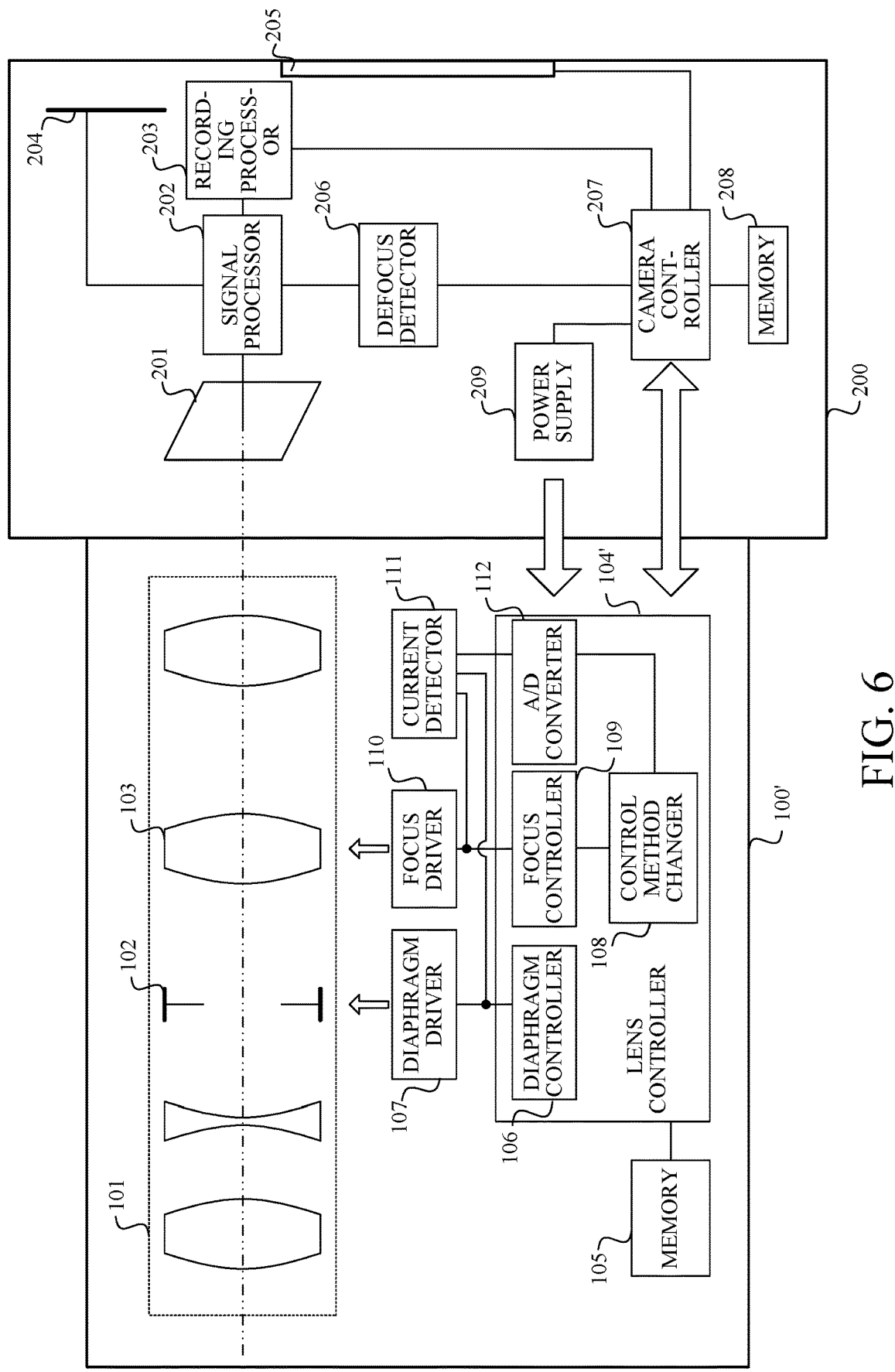
FIG. 6 illustrates a configuration of a camera system according to a second embodiment of the present invention.

FIG. 6 illustrates a configuration of an interchangeable lens type camera system 10 according to a second embodiment of the present invention. In this embodiment, those elements, which are corresponding elements in the first embodiment, will be designated by the same reference numerals as those of the first embodiment and a description thereof will be omitted. The camera system 10 includes a camera body 200 having the same configuration as that of the embodiment, and a lens apparatus 100' that is attachable to and detachable from the camera body 200 and includes a current detector 111.

The current detector 111 is an IV conversion amplifier including, for example, a shunt resistor and an amplifier, and converts the current value flowing in each of the diaphragm driver 107 and the focus driver 110 into a voltage value to inputs the voltage value in the A/D converter 112 in the lens controller 104'. The control method changer 108 in the lens controller 104' uses the output voltage from the A/D converter 112 to calculate the power consumption of each of the diaphragm driver 107 and the focus driver 110.

Figure 7:
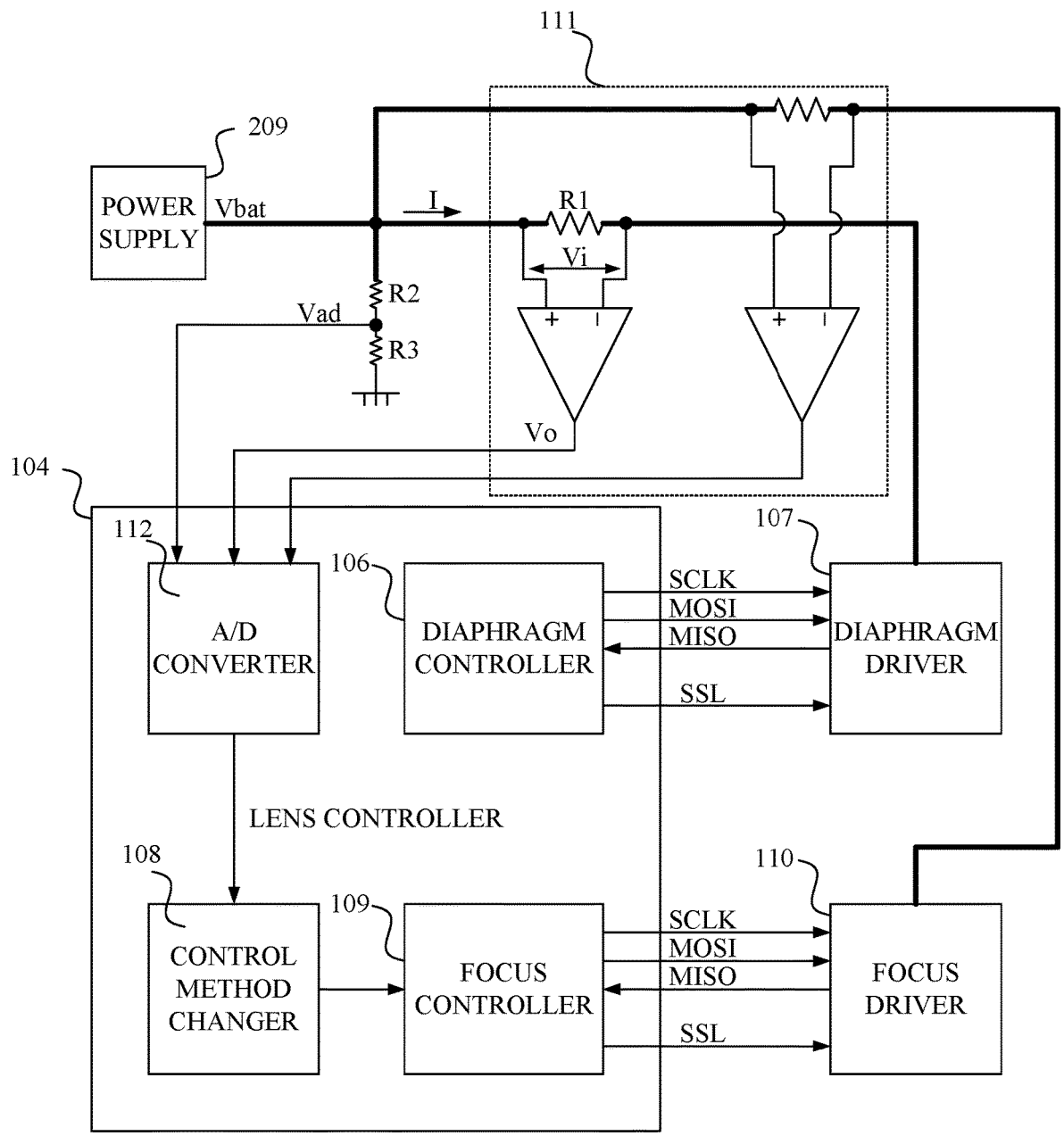
FIG. 7 illustrates a circuit configuration according to the second embodiment.

Referring now to FIG. 7, a more detailed description will be given of the current detector 111 and the A/D converter 112. The voltage Vbat supplied from the power supply 209 is applied to the diaphragm driver 107 and the focus driver 110 via the current detector 111. The current (consumed current) flowing in each driver and the consumed power in each driver can be calculated by the following procedure. Since the diaphragm driver 107 and the focus driver 110 have the same procedures for calculating the consumed current and consumed power, the procedures for calculating the consumed current and consumed power of the diaphragm driver 107 will now be described.

When the current flows through the diaphragm driver 107, a differential voltage Vi is generated by the shunt resistor R1. The differential voltage Vi is input to the A/D converter 112 as an output voltage Vo amplified G times by the gain of the amplifier. The output voltage Vo is calculated by the following expression (1):

$$\text{Output voltage } Vo = \text{current } I \times \text{shunt resistance } R1 \times \text{gain } G \quad (1)$$

where I is the current flowing through the diaphragm driver 107.

The output voltage Vo after the A/D conversion read by the A/D converter 112 is converted into the current I by the conversion method described later.

The consumed power can be calculated as follows: The A/D converter 112 reads the voltage Vbat obtained by dividing the voltage Vbat by the resistors R2 and R3, and the read value is converted into the voltage Vbat and multiplied by the current I described above. A method of converting the voltage Vad into the voltage Vbat will be described later. The voltage Vad input to the A/D converter 112 is obtained by the following expression (2).

$$\text{Voltage } Vad = \text{voltage } Vbat \times \text{resistance } R2 \times (\text{resistance } R2 + \text{resistance } R3) \quad (2)$$

The A/D converter 112 in this embodiment can represent 0V to 3.3V using 12 bits (0 to 4095). The LSB (Least Significant bit) of the A/D converter 112 or the voltage per 1 bit can be obtained by the following expression (3).

$$LSB(A/D) = \text{maximum voltage} \div (2^{\text{bit number}} - 1) \quad (3)$$

In the case of the A/D converter 112 in this embodiment, it is 0.80586 mV/LSB.

Next follows a description of a method of converting the output voltage Vo into the current I. The current I per 1 bit is calculated as in the following expression (4) based on the expressions (1) and (3) mentioned above.

$$\text{LSB(current } I) = \text{LSB}(A/D) \pm (\text{shunt resistance } R1 \times \text{gain } G) \quad (4)$$

For example, the current I per 1 bit when the shunt resistance R1 is 10 mΩ and the gain G is 100 times is 0.80586 mA/LSB.

Next follows a description of a method of converting the voltage Vad into the voltage Vbat. The voltage value of the voltage Vbat per 1 bit is obtained from the above expressions (2) and (3) as in the following expression (5).

$$\text{LSB(voltage Vbat)} = \text{LSB}(A/D) \pm \{\text{resistor } R2 \times (\text{resistor } R2 + \text{resistor } R3)\} \quad (5)$$

The voltage value of the voltage Vbat per bit when both of the resistances R2 and R3 are 100 kΩ is 1.61172 mV/LSB. In other words, the LSB of the power obtained from the current I and the voltage Vbat detected by the A/D converter 112 in this embodiment is 1.29882 μW/LSB.

In this way, the consumed current and consumed power of each of the diaphragm driver 107 and the focus driver 110 can be calculated.

Although a filter circuit is not formed in this embodiment, since the current I and the voltage Vbat vary, an analog filter may be applied or a digital filter may be applied to a detection result of the A/D converter 112. Both an analog filter and a digital filter may be applied.

Figure 8:
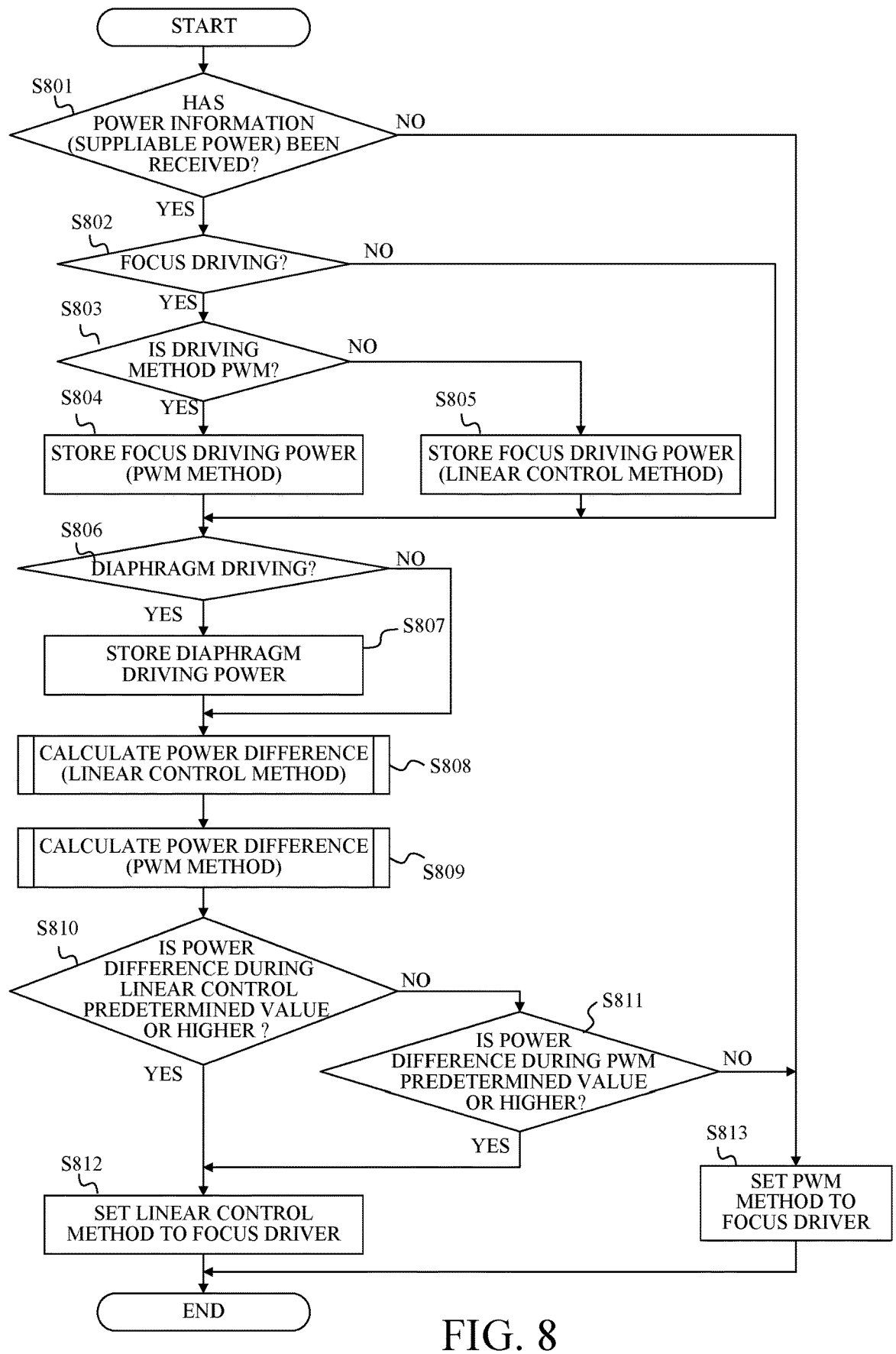
FIG. 8 is a flowchart showing control method setting processing according to the second embodiment.

A flowchart in FIG. 8 shows processing in which the control method changer 108 sets (changes) the control method to be instructed to the focus controller 109. The control method changer 108 starts this processing according to the computer program when the lens apparatus 100 is activated (power supply starts), when a focus driving command is received from the camera controller 207, when the remaining battery life in the camera body 200 changes, and the like.

In the step 801, the control method changer 108 determines whether or not the power information has been received from the camera controller 207. If the power information has been received, the flow proceeds to the step 802, and if it has not been received, the flow proceeds to the step 813.

In the step 802, the control method changer 108 determines whether or not the focus driver 110 is being driven. If it is being driven, the flow proceeds to the step 803, and if it is not being driven, the flow proceeds to the step 806.

In the step 803, the control method changer 108 determines whether or not the current control method of the focus driver 110 is the pulse width modulation control method. If the current control method is the pulse width modulation control method, the flow proceeds to the step 804, otherwise (linear control method), the flow proceeds to the step 805.

In the step 804, the control method changer 108 stores the consumed power of the focus driver 110 in the pulse width modulation control method in the internal memory (RAM) area, and proceeds to the step 806.

In the step 805, the control method changer 108 stores the consumed power of the focus driver 110 in the linear control method in the RAM area, and proceeds to the step 806.

In the step 806, the control method change unit 108 determines whether or not the diaphragm driver 107 is being driven. If it is being driven, the flow proceeds to the step 807, and if it is not being driven, the process proceeds to the step 808.

In the step 807, the control method changer 108 stores the consumed power of the diaphragm driver 107 in the RAM area, and proceeds to the step 808.

In the step 808, the control method changer 108 subtracts an added value between the consumed power in the linear control method stored in the RAM area in the step 805 and the consumed power of the diaphragm driver 107, from the suppliable power indicated by the power information received from the camera controller 207. Then, this subtraction result is stored in the RAM area as a power difference in the linear control method, and the flow proceeds to the step 809.

In the step 809, the control method changer 108 subtracts the added value between the consumed power in the pulse width modulation control method stored in the RAM area in the step 804 and the consumed power of the diaphragm driver 107 from the suppliable power indicated by the power information received from the camera controller 207. Then, the subtraction result is stored in the RAM area as a power difference in the pulse width modulation control method, and the flow proceeds to the step 810.

In the step 810, the control method changer 108 determines whether or not none of the consumed power of the linear control method stored in the RAM area in the step 805 and the consumed power of the diaphragm driver 107 stored in the RAM area in step 807 are not 0, and a power difference in the linear control method stored in the RAM area in the step 808 is equal to or larger than a predetermined value. The predetermined value is equivalent to, for example, 1 W, and more specifically, the control method changer 108 determines whether or not the power difference is 769,928 bits or more. The control method changer 108 proceeds to the step 812 if the power difference is equal to or larger than the predetermined value, and proceeds to the step 811 if it is smaller than the predetermined value.

In the step 811, the control method changer 108 determines whether or not both of the consumed power of the pulse width modulation control method stored in the RAM area in the step 804 and the consumed power of the diaphragm driver 107 stored in the RAM area in the step 807 are not 0, and a power difference in the pulse width modulation control method stored in the RAM area in the step 809 is equal to or larger than a predetermined value. The predetermined value is equivalent to, for example, 3 W, and more specifically the control changer 108 determines whether or not it is 2,309,783 it or more. The control method changer 108 proceeds to the step 812 if the power difference is equal to or larger than the predetermined value, and proceeds to the step 813 if it is smaller than the predetermined value.

In the step 812, the control method changer 108 instructs the focus controller 109 to set the control method of the focus driver 110 to the linear control method because there is a sufficient difference between the suppliable power and the consumed power. Then, this processing ends.

In the step 813, the control method changer 108 instructs the focus controller 109 to set the control method of the focus driver 110 to the pulse width modulation control method because the difference between the suppliable power and the consumed power is not sufficient or the difference cannot be correctly found. Then, this processing ends.

This embodiment sets the linear control method having a small noise amount to the control method of the focus driver 110, when a difference between the suppliable power from the camera body 200 to the lens apparatus 100 and a total consumed power of the diaphragm driver 107 and the focus driver 110 as the plurality of drivers provided in the lens apparatus 100 is equal to or larger than a predetermined value, and sets the pulse width modulation having a lower consumed power of the focus driver 110 when the difference is smaller than the predetermined value. This configuration can properly drive the focus lens 103 according to the suppliable power from the camera body 200 to the lens apparatus 100 while reducing noises that may be superimposed on the imaging signal from the image sensor 201.

According to the description in this embodiment, the control method of the focus driver 110 is changed according to the difference between the suppliable power and the consumed power, but the consumed power at this time may be a value averaged over a predetermined time. The same effect can be obtained by changing the control method of the focus driver 110 according to the difference between the consumed current and the suppliable current instead of the consumed power.

Third Embodiment

Figure 9:
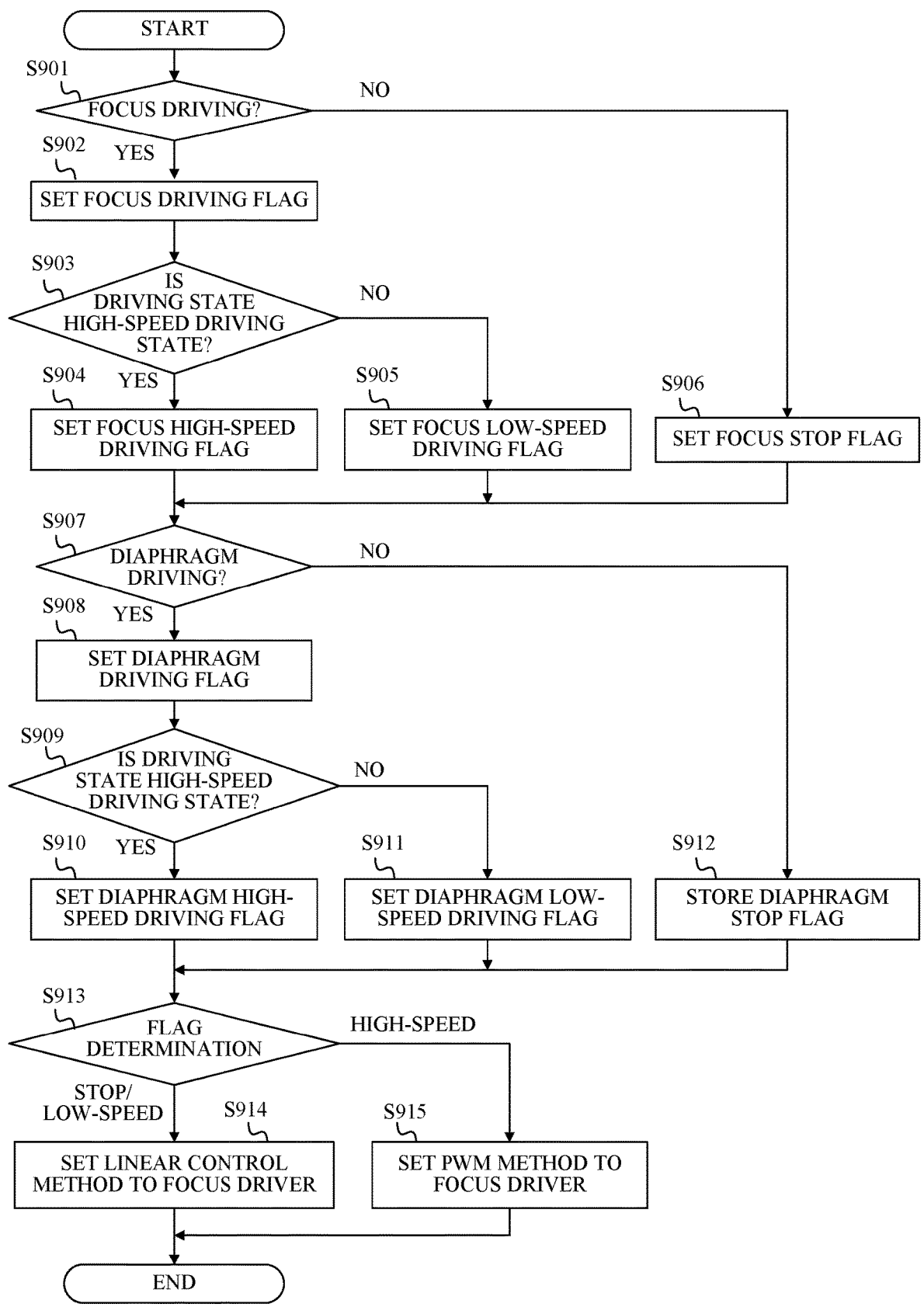
FIG. 9 is a flowchart showing control method setting processing according to a third embodiment of the present invention.

Next follows a description of a third embodiment according to the present invention. This embodiment changes the control method of the focus driver 110 according to a driving state of each of a plurality of drivers (diaphragm driver 107 and focus driver 110) included in the lens apparatus 100. Those elements in this embodiment, which are corresponding elements in the first embodiment, will be designated by the same reference numerals as those of the first embodiment and a description thereof will be omitted. A flowchart in FIG. 9 shows processing in which the control method changer 108 sets (changes) the control method to be instructed to the focus controller 109 in this embodiment. The control method changer 108 starts this processing according to a computer program. The lens controller 104, as a driving state acquirer, acquires the driving states of the focus driver 110 and the diaphragm driver 107 (being driven, high-speed driving state, low-speed driving state, and stopped).

In the step 901, the control method changer 108 determines whether the driving state of the focus driver 110 is being driven or stopped. If it is being driven, the flow proceeds to the step 902, and if it is stopped, the flow proceeds to the step 906.

In the step 902, the control method changer 108 sets a focus driving flag indicating that the focus driver 110 is being driven in the RAM area, and proceeds to the step 903. The focus driving flag is set by setting the focus driving/stopping bit in the flag data of a plurality of bits to 1.

Next, in the step 903, the control method changer 108 determines whether the driving state of the focus driver 110 is a predetermined high-speed driving state or a predetermined low-speed driving state, that is, whether the focus actuator driving speed is equal to or higher than a predetermined speed or lower than the predetermined speed. The control method changer 108 proceeds to the step 904 if the driving state of the focus driver 110 is the high-speed driving state, and proceeds to the step 905 if it is the low-speed driving state.

In the step 904, the control method changer 108 sets the focus high-speed driving flag indicating that the focus driver 110 is in the high-speed driving state in the RAM area, and proceeds to the step 907. The focus high-speed driving flag is set by setting the focus high-speed/low-speed bit in the flag data to 1.

In the step 905, the control method changer 108 sets the focus low-speed driving flag indicating that the focus driver 110 is in the low-speed driving state in the RAM area, and proceeds to the step 907. The focus low-speed driving flag is set by setting the focus high-speed/low-speed bit to 0.

In the step 906, the control method changer 108 sets a focus stop flag indicating that the focus driver 110 is stopped in the RAM area, and proceeds to the step 907. The focus stop flag is set by setting the focus drive/stop bit to 0.

In the step 907, the control method changer 108 determines whether the driving state of the diaphragm driver 107 is being driven or stopped. If it is being driven, the flow proceeds to the step 908, and if it is stopped, the flow proceeds to the step 912.

In the step 908, the control method changer 108 sets a diaphragm driving flag indicating that the diaphragm driver 107 is driving in the RAM area, and proceeds to the step 903. The diaphragm driving flag is set by setting the diaphragm driving/stop bit in the flag data to 1.

Next, at the step 909, the control method changer 108 determines whether the driving state of the diaphragm driver 107 is a predetermined high-speed driving state or a predetermined low-speed driving state, that is, whether the driving speed of the diaphragm actuator is equal to or larger than a predetermined speed or smaller than the predetermined speed. The control method changer 108 proceeds to the step 910 if the driving state of the diaphragm driver 107 is the high-speed driving state, and proceeds to the step 911 otherwise.

In the step 910, the control method changer 108 sets the diaphragm high-speed driving flag indicating that the diaphragm driver 107 is in the high-speed driving state in the RAM area, and proceeds to the step 913. The diaphragm high-speed driving flag is set by setting the diaphragm high-speed/low-speed bit in the flag data is set to 1.

In the step 911, the control method changer 108 sets the diaphragm low-speed driving flag indicating that the diaphragm driver 107 is in the low-speed driving state in the RAM area, and proceeds to the step 913. The diaphragm low-speed driving flag is set by setting the diaphragm high-speed/low-speed bit to 0.

At the step 912, the control method changer 108 sets a diaphragm stop flag indicating that the diaphragm driver 107 is stopped in the RAM area, and proceeds to the step 913. The diaphragm stop flag is set by setting the diaphragm driving/stop bit to 0.

In the step 913, the control method changer 108 proceeds to the step 914 when the diaphragm stop flag or the diaphragm low-speed driving flag is set, or when the focus low-speed driving flag is set, and proceeds to the step 915 when the diaphragm high-speed driving flag or the focus high-speed driving flag is set.

In the step 914, the control method changer 108 instructs the focus controller 109 to set the control method of the focus driver 110 to the linear control method. Then, this processing ends.

In the step 915, the control method changer 108 instructs the focus controller 109 to set the control method of the focus driver 110 to the pulse width modulation control method. Then, this processing ends.

This embodiment sets (changes) the control method of the focus driver 110 according to the driving states of the diaphragm driver 107 and the focus driver 110. This configuration can properly drive the focus lens 103 according to the driving state (or consumed power) of each driver in the lens apparatus 100 while reducing noises that may be superimposed on the imaging signal from the image sensor 201.

According to the description of each of the above embodiments, the lens controller in the lens apparatus similarly sets the control method of the focus driver in the lens apparatus, but the camera controller in the camera body may set the control method of the focus driver in the lens apparatus through communications.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processor (CPU), microprocessor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each of the above embodiments can properly drive the driver while reducing noises caused by driving of the driver, when the power is supplied from the image pickup apparatus to the optical apparatus having the driver.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-191639, filed on Oct. 21, 2019, which is hereby incorporated by reference herein in its entirety.

What is claimed is:

1. A control apparatus, in an optical apparatus that is attachable to and detachable from an image pickup apparatus, configured to control an electrically powered driver in the optical apparatus configured to drive a driven member in the optical apparatus, the electrically powered driver receiving electrical power supply from the image pickup apparatus, the control apparatus comprising:
an information acquirer configured to acquire power supply information on the electrical power supply from the image pickup apparatus; and
a changer configured to change a control mode of the electrically powered driver, from among a linear control mode and a pulse width modulation control mode, according to whether suppliable power or current indicated by the power supply information acquired from the image pickup apparatus to the optical apparatus is larger than a predetermined wattage or ampere level.

2. The control apparatus according to claim 1, wherein the changer sets the control mode to:
the linear control mode when the suppliable power or current indicated by the acquired power supply information is larger than the predetermined wattage or ampere level; and
the pulse width modulation control mode when the suppliable power or current indicated by the acquired power supply information is smaller than the predetermined wattage or current level.

3. The control apparatus according to claim 1, wherein the changer:
detects consumed power or current of the electrically powered driver; and
changes the control mode according to a difference between:
the detected consumed power and the suppliable power indicated by the acquired power supply information; or
the detected consumed current and the suppliable current indicated by the acquired power supply information.

4. The control apparatus according to claim 3, wherein:
the optical apparatus includes a plurality of electrically powered drivers, including the electrically powered driver, and
the detected consumed power or the consumed current is a sum of corresponding consumed powers or currents of the plurality of electrically powered drivers.

5. The control apparatus according to claim 3, wherein the changer sets the control mode to:
the linear control mode when the difference is larger than a predetermined value; and
the pulse width modulation control mode when the difference is smaller than the predetermined value.

6. The control apparatus according to claim 2, wherein the linear control mode consumes less power of the electrically driven driver than the pulse width modulation control mode.

7. The control apparatus according to claim 1, wherein the suppliable power or current changes according to a remaining battery life of the image pickup apparatus.

8. A control apparatus, in an optical apparatus that is attachable to and detachable from an image pickup apparatus, configured to control a first electrically powered driver in the optical apparatus configured to drive a first driven member in the optical apparatus, and a second electrically powered driver in the optical apparatus configured to drive a second driven member in the optical apparatus, the control apparatus comprising:
a driving state acquirer configured to acquire a driving state of each of the first electrically powered driver and the second electrically powered driver, the driving state including a predetermined high-speed driving state; and
a changer configured to change a control mode of the first electrically powered driver, from among a linear control mode and a pulse width modulation control mode, according to whether the acquired driving state of any of the first electrically powered driver and the second electrically powered driver is at the predetermined high-speed driving state.

9. The control apparatus according to claim 8, wherein:

the driving state includes a predetermined low-speed driving state, the changer sets the control mode of the first driver to:
- the linear control mode when the acquired driving state of at least one of the first driver or the second driver is at the predetermined low-speed driving state; and
- the pulse width modulation control mode when the driving state of the at least one of the first or second electrically powered driver is at the predetermined high-speed driving state.

10. The control apparatus according to claim 9, wherein:

the driving state includes a stopped state where the first or second electrically powered driver is stopped, and the changer sets the control mode of the first electrically powered driver, while the second electrically powered driver is at the stopped state, to the linear control mode.

11. An optical apparatus comprising:

the control apparatus according to claim 1;

the driven member; and the electrically powered driver.

12. An image pickup apparatus comprising:
the control apparatus according to claim 1; and
an image sensor,
wherein the control apparatus changes the control mode of the electrically powered driver in a state where the image pickup apparatus is communicating with the optical apparatus.

13. A control method configured to control an electrically powered driver configured to drive a driven member, the electrically powered driver and the driven member being provided in an optical apparatus that is attachable to and detachable from an image pickup apparatus, the electrically powered driver receiving electrical power supply from the image pickup apparatus, the control method comprising the steps of:
acquiring power supply information on the electrical power supply from the image pickup apparatus; and
changing a control mode of the electrically powered driver, from among a linear control mode and a pulse width modulation control mode, according to whether suppliable power or current indicated by the power supply information received from the image pickup apparatus is larger than a predetermined wattage or ampere level.

14. A non-transitory computer-readable storage medium storing a computer program executable by a computer that controls an optical apparatus that is attachable to and detachable from an image pickup apparatus, to execute the control method according to claim 13.

* * * * *